Dec. 2, 1969          H. G. THRASHER ET AL          3,481,208
STABILIZED PLATFORM WITH CANTILEVERED GIMBALS
Filed June 5, 1967                                  4 Sheets-Sheet 1

HOWARD G. THRASHER
TOMMY J. RICKORDS
HAROLD M. BELL, JR.
       INVENTORS

BY

Ernest L. Brown
    ATTORNEY

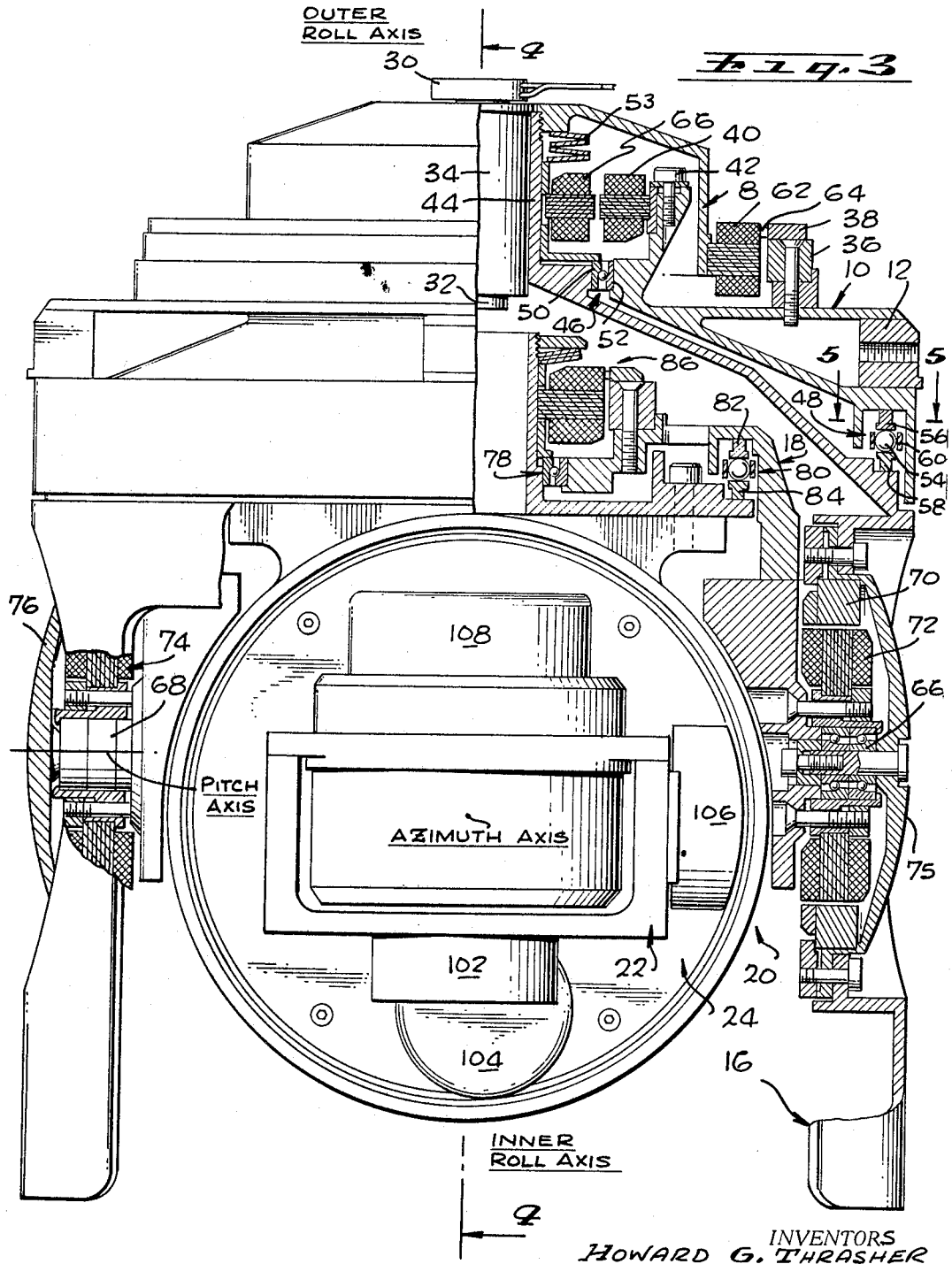

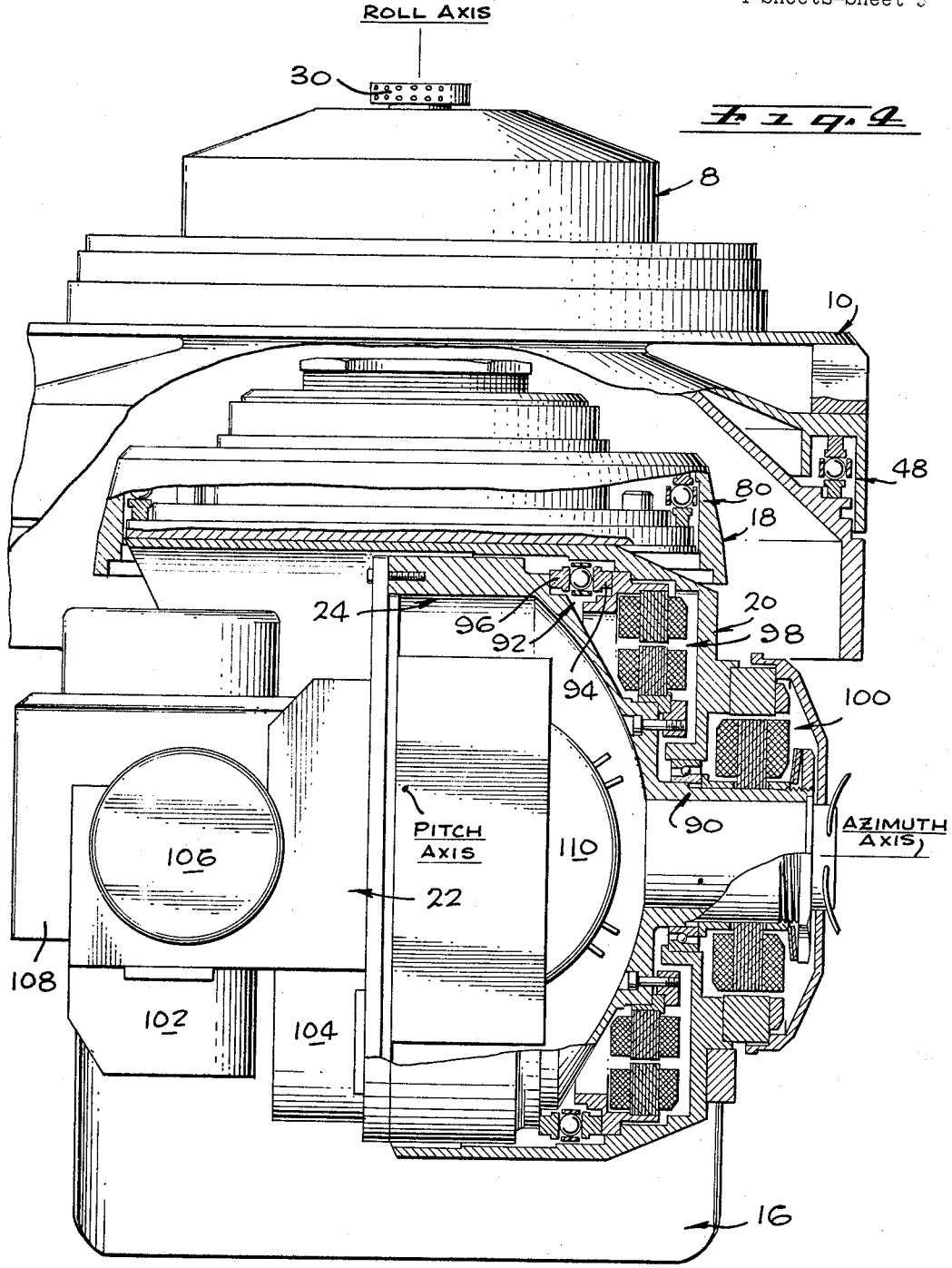

United States Patent Office 3,481,208
Patented Dec. 2, 1969

3,481,208
STABILIZED PLATFORM WITH CANTILEVERED GIMBALS
Howard G. Thrasher, Tommy J. Rickords, and Harold M. Bell, Jr., Los Angeles, Calif., assignors to Litton Systems, Inc., Beverly Hills, Calif.
Filed June 5, 1967, Ser. No. 643,610
Int. Cl. G01c 19/02
U.S. Cl. 74—5.34
12 Claims

ABSTRACT OF THE DISCLOSURE

A gyroscopically stabilized platform having gimbals which are cantilevered and supported by a novel bearing configuration. The bearing configuration consists of a first bearing to support substantially radial loads and a thrust bearing to carry axial loads.

SHORT DESCRIPTION OF THE INVENTION

In gyroscopically stabilized platforms, the gimbal axes must maintain their relative angular positions within closely prescribed limits. To this end, it is customary to support each gimbal on bearings on opposite diameter ends of each gimbal.

Unfortunately, the supporting of the gimbals by bearings on opposite sides of the gimbals increases the weight and size of the stabilized platform and its associated gimbal package.

In prior known cantilevered gimbal configurations, the alignment of the gimbal is not rigidly maintained, or, if maintained, the bearing friction on the alignment bearings is prohibitively high, thus requiring excessive energy to rotate the gimbal.

The device of this invention is a gimbal assembly in which at least one of the gimbals is cantilevered by a novel bearing configuration which has both accurate alignment and low friction features.

It is therefore an object of this invention to support a gimbal in cantilevered fashion with precise alignment and low friction rotation.

It is another object of this invention to cantilever a gimbal on a novel bearing configuration.

It is yet another object of this invention to provide a novel bearing configuration which is adapted particularly to support a structure with highly accurate alignment and very low friction.

Other objects will become apparent from the following description, taken in connection with the accompanying drawings, in which:

FIGURE 3 is an assembly view, partly in section, of the device of this invention;

FIGURE 4 is an assembly view, taken at 4—4 in FIGURE 3, of the device of this invention;

Figure 1:
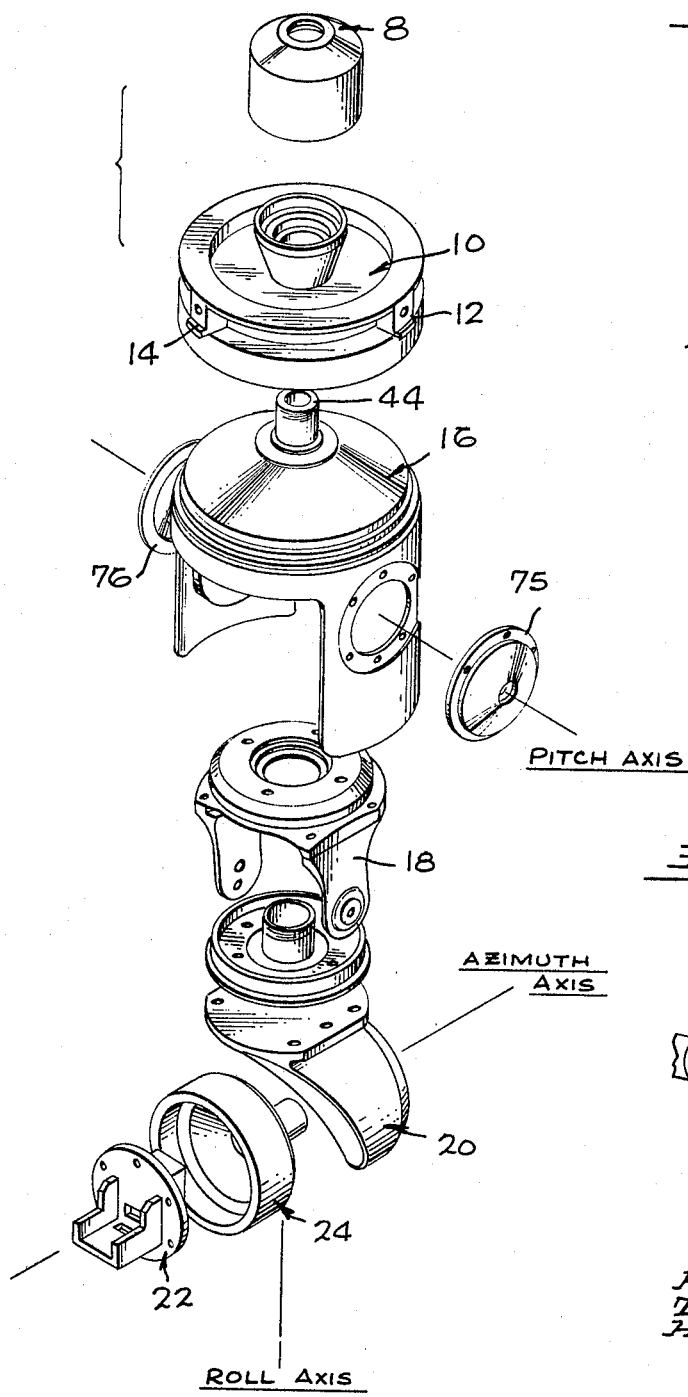
FIGURE 1 is a diagram of a coordinate system used to describe this invention.

FIGURE 1 shows a coordinate system which is used in describing the remaining figures. In the remaining figures, the inner roll and the outer roll axes are shown aligned along the roll axis of FIGURE 1. In operation, there would usually be a non-alignment because of the angular relation between the supporting vehicle and the supported platform. It has been found convenient, however, in describing the device of this invention to show and describe the device with the inner and outer roll axes aligned.

Figure 5:
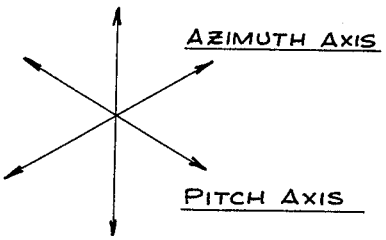
FIGURE 5 is a view of the bearing at 5—5 in FIGURE 4.
Figure 2:
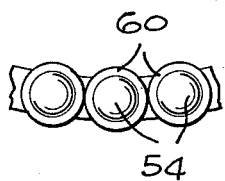
FIGURE 2 is an exploded view of the device of this invention.

As shown particularly in FIGURE 2, the base 10 is adapted to be attached to the supporting craft—for example by attachments 12 and 14. The outer roll gimbal 16 is cantilevered from the base 10 for freedom of rotation about the roll axis. The pitch gimbal 18 is supported for rotation about the pitch axis relative to the outer roll gimbal 16. The inner roll gimbal 20 is cantilevered for rotation about the inner roll axis relative to the pitch gimbal 18. The stabilized platform 22 is mounted upon the azimuth gimbal 24 for rotation, about the azimuth axis, relative to the inner roll gimbal 20. Details of the construction will be described in connection with FIGURES 3, 4 and 5.

The support member 10 is attached to the aircraft by means such as—for example—members 12 and 14. The wiring harness is attached to a slip ring support 30–32 and to the supporting craft. The wiring harness is stationary with respect to the supporting craft. The wires leading from the wiring harness may—for example—be attached to a dust cover which is supported by the supporting member 10. Further, the wires may—for example—be cemented to each dust cover. The slip ring member 30–32 carries a plurality of slip rings (not shown) which are adapted to be engaged by brushes (not shown) attached to the rotatable portion 34. Internal wiring between the gimbals is omitted for the sake of simplicity. The support member 10 also supports a permanent magnet 36 which is a portion of a torque applying member adapted to apply torque to the outer roll gimbal 16. A slip ring 38 is conveniently attached to the permanent magnet 36. The stationary portion 40 of a pickoff or synchro is carried by a post 42 which is attached to the stationary member 10.

A rotatable end bell 8 is adapted to screw onto the post member 44 of the outer roll gimbal 16 and to rotate with the outer roll gimbal 16. The interior of the post 44 is adapted to hold the rotatable portion 34 of the slip ring assembly.

The outer roll gimbal 16 is cantilevered and supported for rotation by the two bearing structures 46 and 48. The bearing structure 46 is a pre-loaded ball bearing set having an inner race 50 and an outer race 52. The ball bearing set 46 is pre-loaded by the Belleville spring 53 which transmits a substantially constant force from member 8 to the race 50 to push the balls in the set 46 against the race 52. Member 8, in turn, is axially restrained through member 44 and bearing 48 relative to race 52.

The bearing set 48 is an alignment bearing and comprises a plurality of spherical balls 54 rolling against two flat surfaces formed by the members 56 and 58. The balls 54 are separated—for example—by plastic collars 60, as shown more particularly in FIGURE 5. A bearing such as that shown at 48 has extremely low friction and is very rigid, thereby allowing a cantilevered gimbal system to be used. The ball 54 makes substantially a point contact with surfaces 56 and 58. Because of the large radius from the axis of rotation, and because of the large number of balls 54 which are allowed by that large radius, a very stiff and accurate alignment is possible. The pre-loading force of bearing 46 also axially loads bearing 48, as described below in connection with FIGURE 6.

The cap member 8, which rotates with the outer roll gimbal 16, supports the rotatable portion 62 of the torque-applying-member which is energized from slip ring 38 through at least one brush such as the brush 64. The rotatable portion 66 of the pickoff or synchro member is supported, through its laminations, between the race 50 and the spring 53. The electrical connections from winding 66 are carried out through the slip ring assembly 32 and 34 to the wiring harness 30.

The pitch gimbal 18 is supported relative to the outer roll gimbal 16 by a conventional pair of bearing structures 66 and 68, which need not be described in detail. The bearings 66 and 68 are each shown in the FIGURE 3 as a pre-loaded pair of ball bearing sets. A permanent magnet 70 upon the outer roll gimbal 16 and a laminated member with an electrical winding 72 upon the pitch gimbal cooperate to apply torque between the outer roll gimbal and the pitch gimbal. A portion of the corresponding pickoff or synchro is shown at the other end of the pitch axis at 74 to measure the angular displacement between the outer roll gimbal 16 and the pitch gimbal 18. The end covers 75 and 76 enclose, respectively, the torquers and pickoffs.

The inner roll gimbal 20 is cantilevered relative to the pitch gimbal 18, and is supported for rotation by a pair of bearing structures 78 and 80. Bearing structures 78 and 80 are identical to bearing structures 46 and 48, respectively, although they may differ in size. Again the flat surfaces of the members 82 and 84 produce extremely accurate alignment between the pitch gimbal 18 and the inner roll gimbal 20 along the inner roll axis—an accuracy that would not be possible without introducing either high friction or the use of a non-cantilevered support. A means for applying torque between the pitch gimbal 18 and the inner roll gimbal 20 is shown at 86. A means for sensing relatively small displacements between the pitch gimbal 18 and the inner roll gimbal 20 is not shown.

The azimuth gimbal 24 is cantilevered relative to the inner roll gimbal 20 and is supported for rotation by a pair of bearing structures 90 and 92. The bearing structures 90 and 92 are identical to the bearing structures 46 and 48, respectively. Close alignment is maintained by the ball of bearing 92 rolling on the flat surfaces of members 94 and 96. A means 98—such as a synchro—is used to generate signals which are measures of the angular displacement of the azimuth gimbal 24 relative to the inner roll gimbal 20. A torquing member or torquer 100 is adapted to apply torque between the azimuth gimbal 24 and the inner roll gimbal 20.

The stabilized platform 22 is rigidly attached to the azimuth gimbal 24 to move therewith, and is adapted to support gyroscopes and accelerometers. For example, three accelerometers are shown at 102, 104 and 106. Two gyroscopes are shown at 108 and 110. The accelerometers and gyroscopes (which may be two axes gyroscopes) operate in a conventional manner to stabilize the platform and to be used as an inertial measurement unit.

Figure 6:
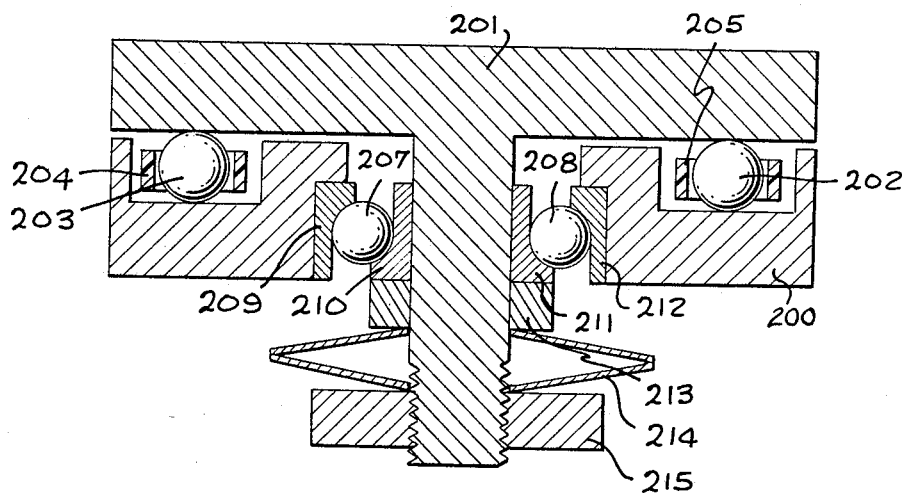
FIGURE 6 is a model of a typical bearing configuration used in this invention.

FIGURE 6 has been added to demonstrate the configuration of a typical bearing pair and its operation. The bearing configuration of FIGURE 6 corresponds to the configuration of bearings 46–48, 78–80, and 90–92.

In FIGURE 6, the balls 202, 203 represent two balls of the bearings, a pure thrust bearing, rolling over a pair of parallel flat surfaces, on members 200 and 201, which are both perpendicular to the axis of relative rotation. Each ball, such as balls 202 and 203, is separated from its adjacent ball by a low-friction sleeve 204 and 205, which may be made—for example—of Teflon.

An angularly pre-loaded bearing set having a plurality of balls, such as balls 207, 208, positioned in races 209 and 210, carry the radial load between members 200 and 201.

The pre-load is maintained by a leaf spring, such as Belleville spring 214, through spacer 213 and race 210, and through an adjustable member 215. It is understood that spring 214 exerts a downward force on member 215 and 201 against bearing 202 and 203. The upward force is transmitted through spacer 213 and race 210 to bearing 207, 208, thence through race 209 and member 200 to bearing 202, 203.

By making the radius of bearing 202, 203 as large as practical, rolling against a precisely oriented pair of flat surfaces, extremely precise alignment, with high resistance to bending and resulting low friction is achieved and maintained.

The accuracy of the alignment could have been obtained by a plurality of balls rolling in a pair of V-grooves. However, such a bearing would have very high friction and would, in fact, usually require a gear train, or the like, to move the gimbals with respect to each other.

With the double bearing sets, such as 46 and 48, the friction has been found to be extremely small. The friction of the bearing set 48—for example—with its large number of balls and large radius has been found to be approximately equal to the friction of the ball bearing set 46 which is a typical loaded ball bearing member. Thus, the feasibility of the use of a cantilevered gimbal system occurs primarily because of the use of the particular ball bearing configuration which is shown.

By using cantilevered gimbals, a smaller stabilized platform and gimbal system with its corresponding reduction in weight and cost is achieved. It should be noted that the pitch gimbal 18 could have been cantilevered relative to the outer roll gimbal 16 by using a pair of ball bearing sets similar to that found at 46 and 48. Because of design considerations, such as access to the gyroscopes and accelerometers, it was decided not to use a cantilevered pitch gimbal. However, it is intended that such a structure be included within the spirit and scope of the claimed invention. To cantilever the pitch gimbal would require that one side of the outer roll gimbal which supports the pitch gimbal be strengthened and that the pickoff member 74 be placed on that end.

Thus, the apparatus of this invention is a plural gimbal system which is adapted to support—for example—inertial instruments (although it could be used to support a single gyroscope, or the like). The device of this invention is shown with inner and outer roll axes, a pitch axis, and an azimuth axis, although it could have been shown with other gimbals configurations and with a different order of gimbals. Further, it is intended that a single rotational gimbal supported with bearings in the configuration of the bearings of FIGURE 6 be embodied within the concept of this invention.

Although the invention has been described in detail above, it is not intended that the invention should be limited expressly by those details.

What is claimed is:

1. In a gimbal system:
   a pair of members mounted for relative rotation by first and second bearing means disposed between said members at one end portion of said members;
   said first bearing means for supporting substantially radial loads, being disposed in races formed in adjacent surfaces of said members; and
   said second bearing means for supporting substantially axial loads, being disposed between surfaces of said members which are substantially perpendicular to the axis of relative rotation of said members.

2. The device of claim 1 wherein said first and second bearing means each includes at least one rolling bearing set, and further including resilient means for loading at least one of said bearing sets.

3. The device of claim 2 wherein said bearing sets each comprise ball bearings, with the ball bearings of said second bearing means having a larger radius than the ball bearings of said first bearing means, said first bearing means having a pre-loaded bearing set; and said resilient means includes means for axially loading the bearing set of said second bearing means, said resilient means acting through the pre-loaded bearing set of said first bearing means.

4. In combination:
   a base;
   a first gimbal, cantilevered, by a first pair of bearings, for rotation about a first axis relative to said base;
   a second gimbal, supported for rotation relative to said first gimbal by a second pair of bearings, about a second axis perpendicular to said first axis;
   a third gimbal, cantilevered, by a third pair of bearings, for rotation relative to said second gimbal about a third axis perpendicular to said second axis;

a fourth gimbal, cantilevered, by a fourth pair of bearings, for rotation relative to said third gimbal about a fourth axis perpendicular to said third axis;

at least one of said pairs of bearings comprising a pre-loaded ball bearing set, and a thrust bearing having a large radius adapted to carry axial loads and to maintain alignment between its adjacent gimbals.

5. A device as recited in claim 4 in which said large radius thrust bearing is a ball bearing set in which the balls of the set roll on flat surfaces whose planes are perpendicular to the axis of relative rotation between said adjacent gimbals, and in which said large radius bearing is axially loaded through the pre-loaded races of said pre-loaded ball bearing set of the same said pair of bearings.

6. A device as recited in claim 5 in which said first axis is the outer roll axis; said second axis is the pitch axis, said third axis is the inner roll axis and said fourth axis is the azimuth axis of a stabilized platform.

7. A device as recited in claim 6 and further comprising means for sensing angular rotations between said gimbals and for applying torques between said gimbals.

8. A device as recited in claim 7 and further comprising a plurality of gyroscopes and accelerometers supported by said fourth gimbal.

9. A device as recited in claim 8 in which said pre-loading of said bearings is caused by the compression of springs.

10. A device as recited in claim 9 in which said springs are Belleville springs.

11. A device as recited in claim 10 in which each ball of said large radius bearings is separated from its adjacent ball by a low friction separator.

12. A multi gimbal system comprising:

a plurality of inter-connected, relatively rotatable gimbals, at least one of which is cantilevered from its next adjacent gimbal;

at least one of said cantilevered gimbals being supported by at least a pair of ball bearing sets, one of which is a pre-loaded ball-bearing set, and the other of which is a thrust ball-bearing set in which the balls roll on a pair of flat surfaces which are perpendicular to the common axis of rotation, and in which said thrust ball-bearing set is loaded through said pre-loaded set.

References Cited

UNITED STATES PATENTS 3,279,721  10/1966  Dethman.
3,340,739   9/1967  Colton et al. _____ 74—5 XR FRED C. MATTERN, Jr., Primary Examiner MANUEL ANTONAKAS, Assistant Examiner U.S. Cl. X.R.

74—5; 308—238